Feb. 14, 1933.     I. COWLES     1,897,609
LUBRICANT DISCHARGE VALVE FOR FORCE FEED LUBRICATING SYSTEMS
Filed Aug. 26, 1929     2 Sheets-Sheet 1

Inventor.
Irving Cowles
By Rudolph [signature]
Attorney.

Feb. 14, 1933.     I. COWLES     1,897,609
LUBRICANT DISCHARGE VALVE FOR FORCE FEED LUBRICATING SYSTEMS
Filed Aug. 26, 1929    2 Sheets-Sheet 2
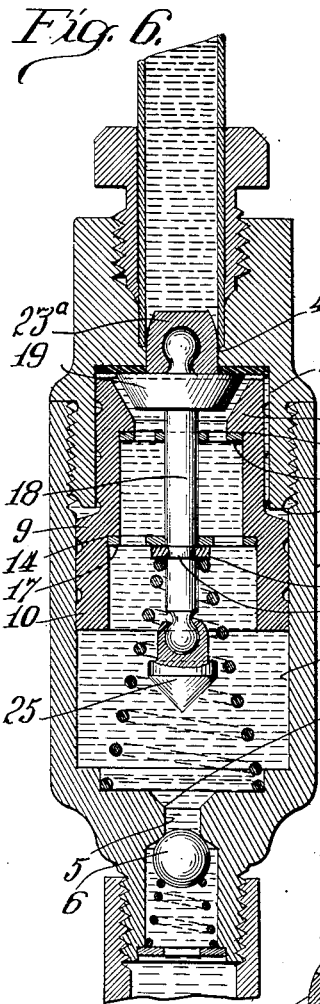
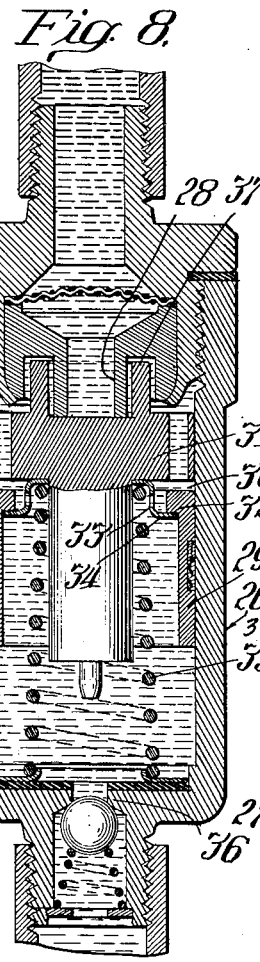
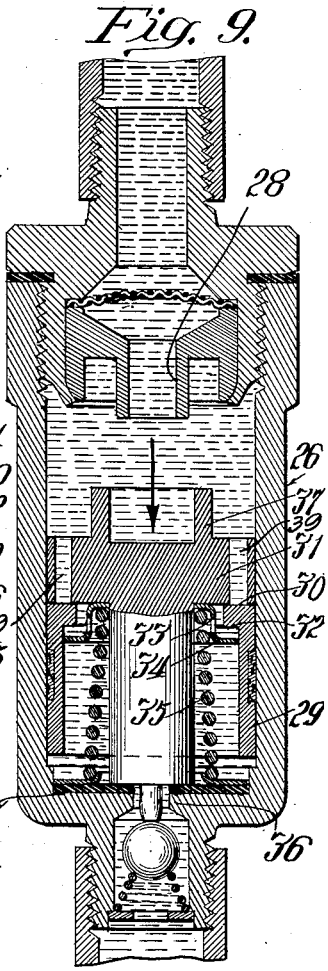
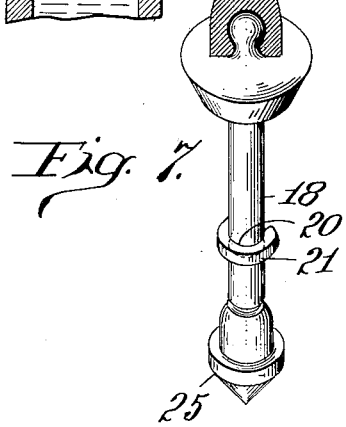
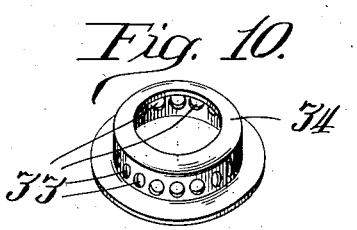
Inventor
Irving Cowles
By
Attorney.

Patented Feb. 14, 1933

1,897,609

UNITED STATES PATENT OFFICE

IRVING COWLES, OF DETROIT, MICHIGAN, ASSIGNOR TO UNION BANK OF CHICAGO, OF CHICAGO, ILLINOIS, A CORPORATION OF ILLINOIS, AS TRUSTEE

LUBRICANT DISCHARGE VALVE FOR FORCE FEED LUBRICATING SYSTEMS

Application filed August 26, 1929. Serial No. 388,322.

This invention relates to improvements in valve structures for force feed lubricating systems, and more particularly to discharge valves to be mounted on bearings to be lubricated for feeding to the latter measured volumes of lubricant at each operation of a feed pump common to a multiplicity of said valves.

The main object of the present invention is to provide a valve structure of the type specified which is easily and cheaply manufactured in that it requires no such degree of accuracy as will render manufacture in large quantities difficult, while, at the same time, the structure will operate very efficiently with light fluent oils as well as with more viscous lubricants such as heavy oils and greases.

A further object of the invention is to provide a valve structure possessing the several advantages above mentioned wherein a single spring coacting with certain other elements of the structure, efficiently performs several functions and wherein said other elements are particularly designed to promote efficiency of the said spring and permit of great variation in strength of the latter without affecting the operation of the structure.

The present invention may be said to constitute an improvement in and upon the structure shown and described in U. S. Letters Patent No. 1,652,764, dated December 13, 1927.

In the accompanying drawings, I have illustrated several different embodiments of the invention, In said drawings:

Figs. 1, 2, and 3 are central longitudinal sections of a valve structure constructed in accordance with the invention and showing the interior valve mechanism in respectively different positions.

Figs. 4 and 5 are transverse sections of the same on the lines 4—4 and 5—5, respectively, of Fig. 1.

Fig. 6 is a view similar to Fig. 1 showing modifications of certain specific details of construction.

Fig. 7 is a perspective view, partly in section, of the valve of the piston of Fig. 6.

Figs. 8 and 9 are sectional views, similar to Figs. 1 and 2, of another embodiment of the invention.

Fig. 10 is a perspective view of a member of the structure of Figs. 8 and 9.

The present invention, besides being an improvement over the structure of the aforesaid patent, is directly related to the structure shown and described in my pending application for Patent, Serial No. 388,323, filed on August 26, 1929, the specific distinctions between the two structures being hereinafter set forth.

Figure 1:
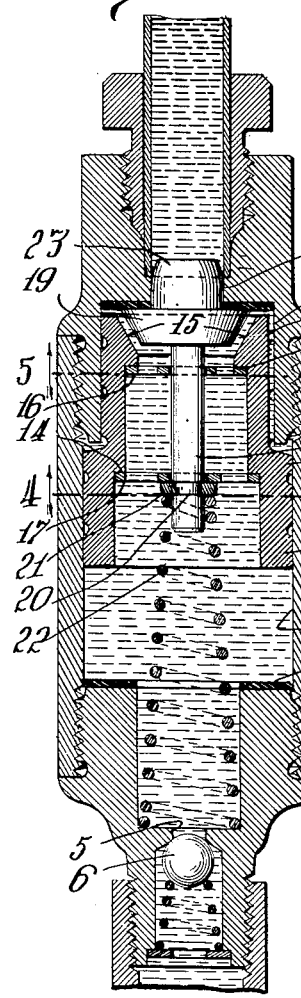
Figure 2:
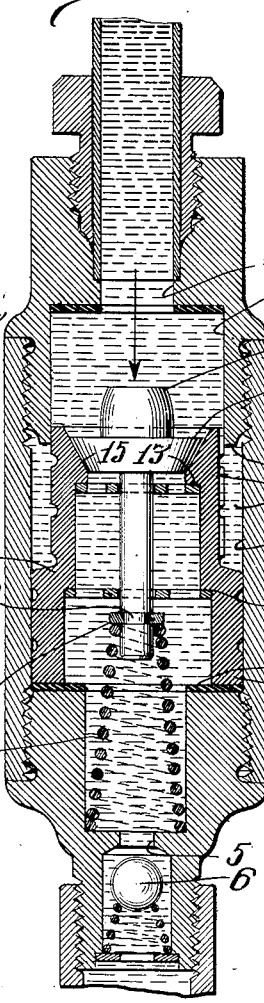
Figure 3:
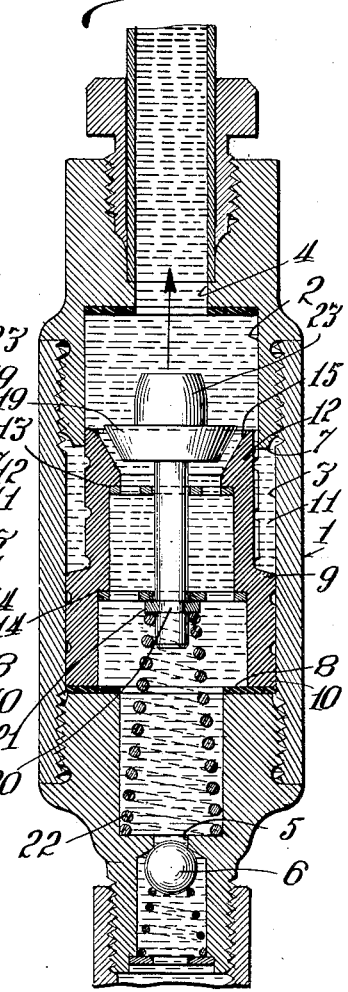
Figure 4:
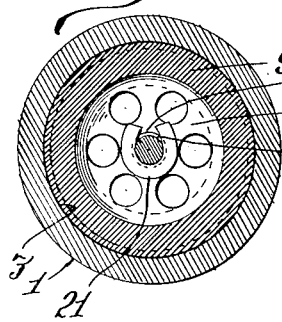
Figure 5:
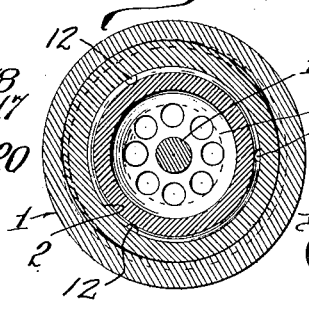

The present invention, in its preferred embodiment, shown in Figs. 1, 2, and 3, comprises a casing 1 having a cylindrical bore, the latter including a small diameter end portion 2 and a larger diameter portion 3. The smaller diameter portion 2 extends inwardly from the intake port 4 at one end of the casing, the latter being provided with a discharge port 5 at its other end which, preferably, is controlled by the spring-held check-valve 6.

In the structure of Figs. 1, 2, and 3, the larger diameter portion 3 of the bore terminates in annular shoulders 7 and 8.

Reciprocable in said casing 1 is a piston 9 having its main portion of a diameter to substantially fit the smaller bore portion 2, the length of said main portion being somewhat greater than the length of the bore 2. The remainder of said piston may be said to comprise the larger diameter portion 10 substantially snugly fitting the larger bore portion 3 of the casing. There is thus provided an annular chamber 11 between the portion 10 of the piston and the shoulder 7 of the casing which elongates as the piston travels toward the discharge port. One or more longitudinal grooves 12 of very small cross sectional area extend from end to end of the main portion of the piston for feeding lubricant to and permitting its discharge from said chamber 11. If the clearance between the piston and the bore portion 2 of the casing is sufficient to permit slow leakage of the lubricant, then the groove or grooves 12 may be omitted.

The piston 9 is provided with a stepped bore to provide two annular shoulders 13 and 14 opposed to the discharge port 5 and is bordered at one end by the valve seat 15 opposed to the intake port 4 and axially aligned with the latter.

Skeleton or foraminous washers 16 and 17 having central guide openings, are driven to seat on the respective shoulders 13 and 14, said openings being of slightly greater diameter than the stem 18 of the valve 19 which seats on the valve seat 15. In said stem, I provide an annular groove 20 which receives the split collar 21 constituting a stop coacting with the washer 17 to limit the opening movement of the valve and also forming a seat for one end of the compression spring 22 which serves to normally maintain the valve 19 open and also serves to maintain the piston 9 at one limit of its movement.

The valve 19 is provided with an axial member 23 which is adapted to enter and substantially fit the intake port 4 as the valve is in normal position. In the structure of Figs. 1, 2, and 3, the member 23 is integral with said valve, whereas in the structure of Fig. 6 the corresponding member 23ª is sufficiently loosely associated with said valve to permit it to adjust itself to the intake port while also permitting the valve 19 to retain its natural position under the influence of the spring 22 and within the limits of lateral movement permitted by the washers 16 and 17.

In the structure of Figs. 1, 2, and 3, the piston 9 constitutes a valve which seats on the annular shoulder 8 to interrupt the flow of lubricant from the discharge port 5 as hereinafter more fully explained, whereas in the structure of Fig. 6 the discharge port 5 is bordered by the valve seat 24 and the longer stem 18 of the valve 19 is provided with a valve 25 having universal joint association with said stem, for cooperation with the seat 24 to stop flow from the discharge port.

To avoid confusion in reading the accompanying drawings, it must be borne in mind that in Figs. 2 and 9, the piston and its valve are traveling downwardly in response to incoming lubricant under pressure, while in Fig. 3 they are traveling upwardly responsively to pressure of the spring. These directions of travel are indicated by arrows in said respective figures.

The operation of the structures of Figs. 1, 2, and 3 and Fig. 6, respectively, is substantially the same. In each instance, assuming the discharge end portion of the casing to be filled with lubricant by reason of previous operations, and the valve 19 being at the normal limit of its movement and, therefore, unseated with respect to the seat 15, and the member 23 or 23ª disposed in the intake port 4 as shown in Figs. 1 and 6, then upon forcing lubricant into the casing under sufficient pressure to overcome the counter pressure of the spring 22, the said incoming lubricant initially acts only upon the member 23 or 23ª to initially force the valve 19 upon the seat 15. Movement of the piston 9 is resisted by the lubricant in the discharge end portion of the casing on the one hand and by that contained in the annular chamber 11 so that until the valve 19 bears upon the seat 15, the said piston is quite firmly held against movement and thereafter its movement is resisted or retarded by the counter pressure of the lubricant in the discharge end portion of the casing acting upon the far greater piston area opposed to the discharge port than is opposed to the intake port and is also retarded by slow flow of lubricant into the chamber 11, the cross sectional area of which is many times greater than that of the total number of grooves 12 or clearance between the piston 9 and bore portion 2 or both. As the piston area opposed to the intake port after the valve is closed is only that small marginal portion bordering the valve seat 15, it will be obvious that the pressure exerted on the valve 19 is exerted on a far larger area than said marginal portion of the piston so that the valve 19 will be maintained seated and will move the piston 9 toward the discharge port responsively to the pressure of inflowing lubricant until the piston 9 seats on the shoulder 8 or the valve 25 reaches the seat 24. At this time a certain measured volume of lubricant will have been discharged from the port 5.

At this point there occurs a slight difference between the operation of the structure of Figs. 1, 2, and 3 and that of Fig. 6. It will be obvious that in the structure of Figs. 1, 2, and 3 the travel of the piston is positively limited by the seat shoulder 8 whereas in the structure of Fig. 6, the further travel of the piston is limited only by the counter pressure of the lubricant remaining in the discharge end portion of the casing.

The pressure applied to said lubricant remaining in the discharge end portion of the casing cannot exceed the degree necessary to overcome resistance to its discharge which we may assume to be twenty-five pounds per square inch, while the pressure of the inflowing lubricant may be several thousand pounds per square inch, this high pressure being desirable to overcome additional resistance offered by tight or "frozen" bearings. Hence, though theoretically the lubricant is an incompressible substance, it may contain a little air or may yield slightly to the last mentioned high pressure sufficiently to cause the valve 19 of Fig. 6 to move responsively to the high pressure in the intake end portion of the casing sufficiently to slightly unseat the now immovable valve 19. This unseating is instantly followed by equalization of pressure throughout the casing 1 but this equalization of pressure will not cause the piston to return to sealing position relatively to the valve 19.

In both structures, upon releasing pressure in the intake end portion of the casing, the spring 22 initially forces the valve 19 to the limit of its opening movement relatively to the piston 9 due again to resistance of the piston to travel by suction on its discharge face and pressure in the chamber 11, the latter being due to slow flow from said chamber into the intake end portion of the casing. After the collar 21 is engaged with the washer 17, the piston is carried back to its initial position and during this movement the lubricant in the intake end portion of the casing plus that discharged from the chamber 11, passes the valve 19 into the discharge end portion, this action being assured by the now sealed discharge port 5.

The above described structures permit the gradual increase of pressure in the intake end portion of the casing as by intermittent operation of a small diameter pump acting upon a sufficient volume of lubricant to exceed the aggregate requirements of a group of the valve structures. Successful operation of the latter depends upon initial and maintained closure of the valve 19 during fluid pressure responsive travel of the piston and upon a sufficiently powerful spring 22 to effect initial opening of the valve 19 preparatory to spring return of the piston to initial position, such opening movement in the case of the structure of Figs. 1, 2, and 3 being resisted to an extent probably no greater than atmospheric pressure on the intake face of the valve 19 or the discharge face of the latter.

Any ordinary pump, the discharge port of which is not controlled by a check-valve, may be used. In using this type of pump, the check-valves 6 of the valve structures associated with the pump constitute, indirectly but positively, the check-valve or valves of the pump.

Pumps of the several types illustrated and described in Letters Patent No. 1,652,764, above referred to and in my pending applications Serial No. 98,886, filed March 31, 1926; Serial No. 131,843, filed August 27, 1926; and Serial No. 221,197, filed Sept. 28, 1927, may also be employed in connection with the valve structures herein illustrated and described.

The structure of Fig. 6 is perhaps somewhat cheaper to manufacture than that of Figs. 1, 2, and 3, but possesses no appreciable advantages over the same.

In Figs. 8 and 9, I have illustrated another embodiment of the invention wherein the bore of the casing 26 is of the same diameter from the shoulder 27 bordering the discharge port to the intake port 28, and the piston 29 is of a corresponding outer diameter throughout its length. Said piston 29 is hollow and is provided at the end opposing the intake port with an opening bordered by the valve-seat 30 on which the valve 31 seats. Bordering said opening and disposed below the valve seat 30 is an annular shoulder 32 which is engaged by the outer annular flange of a ring member 33 having a foraminous cylindrical wall and an inwardly extending flange 34 which bears upon the valve 31 under the constant pressure of the spring 35. The length of the cylindrical wall of the member 33 is greater than the thickness of the flange of the piston presenting a portion of the valve seat 30 and presenting the shoulder 32, the area of the latter added to that of the end of said piston opposed to the discharge port 36 of the casing constituting the piston area subjected to the resistance of lubricant in the discharge end portion of the casing when the valve 31 is seated to restrict the piston area subjected to pressure of incoming lubricant to the small marginal portion, if any, not covered by the said valve 31 and to the aggregate area of the perforations 39 of said valve. Thus during the travel of the piston toward the discharge port, the valve 31 being seated, the greater first-mentioned area will offer sufficient resistance to such travel to prevent the piston from moving relatively to said valve.

In this structure the face of the valve 31 opposed to the intake port of the casing is equipped with an integral cylindrical flange 37 and the lubricant is introduced through the spout 28 which is of slightly less outer diameter than the inner diameter of the flange 37 and normally projects into the latter, thus presenting a very minute annular passage for lubricant between said flange and said spout, the cross-sectional area of which is very much smaller than that of the bore of said spout.

This relative arrangement or association of the spout 28 and flange 37 will cause the incoming lubricant under pressure to be initially exerted on the valve 31 to force the latter to its seat and thereafter the said valve will force the piston to seat on the shoulder 27.

From this point the operation of this structure is identical with that of Figs. 1, 2, and 3, as will be obvious.

It will also be obvious that the structures of Figs. 1 to 3 and Fig. 6, respectively, may be modified by substituting for the members 23 and 23ª, respectively, the spout and cylindrical flange elements of Figs. 8 and 9 without necessitating additional illustration.

It will further be obvious that the structure of Figs. 8 and 9 may be modified to cause the piston thereof to seat on an annular shoulder corresponding to the shoulder 8 of Figs. 1, 2, and 3, and decreasing the length of the valve stem of Figs. 8 and 9, without requiring further illustration.

For the purposes of the appended claims, the aforesaid obvious modification of the structures of Figs. 1, 2, and 3, and Fig. 6 to embody the structural features of the intake portion of the structure of Figs. 8 and 9 and including the intake spout and the cylindrical flange of the opposed face of the piston valve, shall be deemed to be included in the structure of said Figs. 1, 2, 3, and 6, the same as if specifically illustrated therein and, similarly, for purposes of the appended claims, the structure of Figs. 1, 2, and 3 shall be deemed to include the modification consisting in the omission of the seat shoulder 8 and the inclusion of the long valve-stem and valve 25 and the seat 24, the same as though specifically illustrated herein.

The essential difference between the structure of this application and that of the first-mentioned copending application, resides in two main features, one being that in the instant structures the piston valves are normally open whereas in the structures of the copending application, said valves are normally closed; and second, that in the instant structures as in the first above mentioned Letters Patent, a single spring, instead of several thereof, performs the function. Thus the structures of this application may be said to combine with that of said first-mentioned Letters Patent, certain advantages incident to the structure of the first above mentioned copending application. Vice versa, the structures of the latter may be deemed to combine the advantages incident to the structures of this application with those incident to the normally spring-closed valves.

I claim as my invention:

1. A valve structure including a casing provided at opposite ends with intake and discharge ports respectively, a piston reciprocable in said casing, a by-pass duct in said piston, a valve controlling the same, means for limiting the opening movement of said valve, a spring engaged with said valve for maintaining the same normally open and also maintaining the piston normally at the intake end portion of the casing, said piston presenting a greater area opposed to the discharge than to the intake end portion of the casing, and means associated with the piston and casing for retarding travel of said piston.

2. A valve structure including a casing provided at opposite ends with intake and discharge ports respectively, a piston reciprocable in said casing, a by-pass duct in said piston, a valve controlling the same, means for limiting the opening movement of said valve, a spring engaged with said valve for maintaining the same normally open and also maintaining the piston normally at the intake end portion of the casing, said piston presenting a greater area opposed to the discharge than to the intake end portion of the casing, and fluid pressure responsive means associated with the piston and casing for resisting travel of the piston in said casing.

3. A valve structure including a casing provided at opposite ends with intake and discharge ports respectively, a piston reciprocable in said casing, a by-pass duct in said piston, a valve controlling the same, means for limiting the opening movement of said valve, a single spring in said casing common to said valve and said piston for maintaining the latter normally disposed at the intake end portion of the casing and maintaining the said valve normally open, and fluid pressure means associated with said piston and casing for resisting travel of said piston.

4. A valve structure including a casing provided at opposite ends with intake and discharge ports, respectively, a piston reciprocable in said casing, a by-pass duct in said piston, a valve controlling the same, means for limiting the opening movement of said valve, a single spring in said casing common to said valve and said piston for maintaining the latter normally disposed at the intake end portion of the casing and maintaining the said valve normally open, and fluid pressure responsive means associated with the intake end portion of said casing and with said piston for resisting travel of the latter.

5. A valve structure comprising a casing having an intake port at one end and a discharge port at its other end, the bore of said casing comprising two concentric cylindrical portions of different diameters, the smaller diameter portion being adjacent said intake port, a piston comprising a small diameter portion to substantially fit the smaller diameter portion of the bore of the casing and a larger diameter portion to substantially fit the larger bore portion of the casing and providing an annular chamber between the piston and casing adapted to elongate as said piston travels toward the discharge port of the casing, said annular chamber communicating with the intake end portions of the casing, a by-pass duct in said piston, a valve controlling the same, and a single spring common to said valve and said piston to maintain the latter normally at the intake end of the casing and to maintain said valve normally open.

6. A valve structure including a casing provided at opposite ends with intake and discharge ports respectively, a piston reciprocable in said casing, a by-pass duct in said piston, a valve controlling the same, means for limiting the opening movement of said valve, a spring engaged with said valve for maintaining the same normally open and also maintaining the piston normally at the intake end portion of the casing, said piston presenting a greater area opposed to the discharge than to the intake end portion of the casing, and fluid pressure responsive means communicating with one end portion of said casing for yieldingly resisting travel of said piston.

7. A valve structure including a casing provided at opposite ends with intake and discharge ports respectively, a piston reciprocable in said casing, a by-pass duct in said piston, a valve controlling the same, means for limiting the opening movement of said valve, a spring engaged with said valve for maintaining the same normally open and also maintaining the piston normally at the intake end portion of the casing, said piston presenting a greater area opposed to the discharge than to the intake end portion of the casing, and fluid pressure responsive means communicating with the intake end portion of the casing for yieldingly resisting travel of the piston.

8. A valve structure as defined in claim 3 wherein the casing and a reciprocable element within the same are provided with co-operating telescopically interfitting elements adjacent to and associated with the intake port for initial response to pressure of fluid entering said port.

IRVING COWLES.